US00RE40588E

(19) United States
(12) Reissued Patent
Ostendorf et al.

(10) Patent Number: US RE40,588 E
(45) Date of Reissued Patent: Nov. 25, 2008

(54) VENDING MACHINE AUDIT MONITORING SYSTEM WITH MATRIX INTERFACE

(75) Inventors: Eugene G. Ostendorf, Timonium, MD (US); John C. Cowles, Downington, PA (US); Irwin D. Morris, Bel Air, MD (US); Gerald W. Smith, Clayton, NJ (US)

(73) Assignee: Audit Systems Company, Timonium, MD (US)

(21) Appl. No.: 10/179,232
(22) Filed: Jun. 26, 2002

Related U.S. Patent Documents

Reissue of:
(64) Patent No.: 5,924,081
Issued: Jul. 13, 1999
Appl. No.: 08/557,807
Filed: Nov. 14, 1995

(51) Int. Cl.
*G06F 19/00* (2006.01)

(52) U.S. Cl. ..... 705/30; 700/231; 700/236
(58) Field of Classification Search ..... 705/30; 700/231, 236
See application file for complete search history.

(56) References Cited

U.S. PATENT DOCUMENTS 3,841,456 A * 10/1974 Levasseur ..... 194/217
3,894,220 A * 7/1975 Levasseur ..... 700/232
4,216,461 A * 8/1980 Werth et al. ..... 340/5.9
4,272,757 A * 6/1981 McLaughlin et al. ..... 340/5.92
4,280,181 A * 7/1981 Levasseur ..... 705/400
4,284,208 A * 8/1981 Levasseur ..... 221/129
4,354,613 A * 10/1982 Desai et al. ..... 377/1
4,359,147 A * 11/1982 Levasseur ..... 194/200
4,366,481 A * 12/1982 Main et al. ..... 340/10.41
4,369,442 A * 1/1983 Werth et al. ..... 377/7
4,498,570 A * 2/1985 King et al. ..... 194/217
4,553,211 A * 11/1985 Kawasaki et al. ..... 700/236
4,598,378 A * 7/1986 Giacomo ..... 700/236
4,712,049 A * 12/1987 Houserman ..... 318/112
4,766,548 A * 8/1988 Cedrone et al. ..... 700/236
4,785,927 A * 11/1988 Dobbins ..... 194/200
4,823,982 A * 4/1989 Aten et al. ..... 221/3
4,961,507 A * 10/1990 Higgins ..... 221/129
4,967,896 A * 11/1990 Hara ..... 194/217
5,029,098 A * 7/1991 Levasseur ..... 705/10
5,036,966 A * 8/1991 Kaspar et al. ..... 194/217
5,091,713 A * 2/1992 Horne et al. ..... 340/541
5,101,359 A * 3/1992 Gross ..... 700/231
5,103,956 A * 4/1992 Jang ..... 194/217
5,111,962 A * 5/1992 Oden ..... 221/1
5,113,351 A * 5/1992 Bostic ..... 700/236
5,147,021 A * 9/1992 Maruyama et al. ..... 194/217
5,172,829 A * 12/1992 Dellicker, Jr. ..... 221/13
5,184,708 A * 2/1993 Levasseur ..... 194/217
5,205,436 A * 4/1993 Savage ..... 221/7
5,244,266 A * 9/1993 Maldanis ..... 312/116
5,299,113 A * 3/1994 England et al. ..... 700/17
5,360,134 A * 11/1994 Falk et al. ..... 221/2
5,442,568 A * 8/1995 Ostendorf et al. ..... 700/236
5,608,643 A * 3/1997 Wichter et al. ..... 700/244

* cited by examiner

*Primary Examiner*—Michael Cuff
(74) *Attorney, Agent, or Firm*—Rosenberg, Klein & Lee

(57) ABSTRACT

An audit monitoring system (10) is provided for use with any of a multiplicity of different coin operated vending machines (300). The audit monitoring system includes an interface assembly (102) for use in replacing an existing data link (330) within vending machine (300) and interfacing with row and column conductors (306) of vending machine (300). The interface assembly (102) is coupled to an audit monitoring assembly (100) which interprets the communications transferred between a controller (310), coin changer (322), bill validator (324), and motor matrix (304) of vending machine (300). Audit monitoring assembly (100) is powered from a power supply (302) of vending machine (300) and includes interface circuitry (110, 120, 130, 180, 190) for receipt of digital logic level signals, serial data or relay logic signals from vending machine (300). Additionally, the data retrieval terminal (20) may be removably coupled to the audit monitoring assembly (100) through either a hard wired coupling (254) through a serial interface (250) or alternately by means of infrared optical signals (12, 22) through an infrared interface circuit (260).

21 Claims, 10 Drawing Sheets

VENDING MACHINE AUDIT MONITORING SYSTEM WITH MATRIX INTERFACE

Matter enclosed in heavy brackets [ ] appears in the original patent but forms no part of this reissue specification; matter printed in italics indicates the additions made by reissue.

BACKGROUND OF THE INVENTION

FIELD OF THE INVENTION

This invention directs itself to audit monitoring systems for use with coin operated vending machines. In particular, this invention directs itself to an audit monitoring system having an interface assembly for retrofit coupling with existing vending systems of various types and manufacture. Still further, this invention directs itself to an audit monitoring system having a microprocessor controlled audit monitoring assembly coupled to an interface assembly, both being installed in an existing coin operated vending system for monitoring control signals between the vending machine's controller and its funds receiving and dispensing equipment. More in particular, this invention pertains to a microprocessor controlled audit monitoring system wherein predetermined parameters utilized for interpreting transaction data for the coin operated vending machine is output from the system's memory responsive to an identification code input thereto. Further, this invention directs itself to an audit monitoring system utilizing a clock/counter implemented within the microprocessor for such functions as timing power failures and door openings. Still further, this invention is directed to an audit monitoring system which monitors the vending machine's motor matrix in order to identify the occurrence of a vend and the location of the vended product. Additionally, the audit monitoring system of this invention interfaces with the vending machine's motor matrix by monitoring the control signals which are communicated between the vending machine's controller and the motor matrix and interpreting those signals to identify the matrix location of the motor being driven to vend a selected product.

PRIOR ART

Audit monitoring systems are well known in the art. The best prior art known to the Applicants include U.S. Pat. Nos. 5,360,134; 5,299,113; 5,205,436; 5,172,829; 5,113,351; 5,111,962; 5,101,359; 5,091,713; 5,036,966; 5,029,098; 4,961,507; 4,823,982; 4,785,927; 4,712,049; 4,598,378; 4,553,211; 4,498,570; 4,369,442; 4,366,481; 4,359,147; 4,354,613; 4,284,208; 4,272,757; and, 4,216,461.

In prior art systems such as that disclosed by U.S. Pat. Nos. 4,369,442 and 4,216,461, microprocessor controlled audit systems are incorporated in vending machines for temporarily storing transaction data of the machine and subsequently outputting such to a data collection terminal. However, such systems are adapted for interface with one particular type of machine of a single manufacturer. Such systems do not provide any means for retrofit application to existing coin operated vending systems. Further, such systems do not provide any means for utilizing identification codes for signifying a particular type of machine, and utilizing appropriate signal interpreting parameters in conjunction with such codes.

In other prior art systems, such as that disclosed by U.S. Pat. No. 5,036,966, coin validation equipment is provided for retrofit into newspaper vending racks. Such systems have the capability of recording the time and day of sale, and subsequently transferring such data by an optical communications link to a data retrieval device. However, such systems do not provide for retrofit to a multiplicity of different types of machines, made by different manufacturers. Nor, do such systems include any means for interface with a vending machine's controller and coin accepting devices.

In still other prior art systems, such as that disclosed by U.S. Pat. Nos. 5,205,436 and 5,113,351, vending systems coupled to remote processors are provided. Such remote processors are capable of monitoring the transactions of the vending systems, providing usage and inventory data to the vending system operator. However, such systems are designed to operate with a particular type of vending system from a particular manufacturer. Such audit systems are incorporated into the vending equipment at the time of manufacture, and are not capable of retrofit into any of a plurality of existing vending machines.

In yet other prior art systems, such as that disclosed by U.S. Pat. Nos. 5,172,829; 4,598,378; and, 4,553,211 vending control systems are provided that incorporate a management information and control subsystem for monitoring the vending operations of the machine into which it is incorporated. The microprocessor of such systems perform both vending machine control and audit functions, and do not monitor a data link between a control subsystem and a coin changer/bill validator of the machine. Thus, any circuit failure or malfunction will interrupt the operation of the vending machine. Typically, such prior art systems are incorporated into the coin changer, and therefore can only be retrofit into like systems. Those types of systems are found in older "single price machines" and cannot be retrofit into multi-price or modern single price machines. Where these systems are integrated into a separate vending machine controller, they still are limited to control of a single type of machine and are not designed for retrofit installation.

Vend producing devices of vending machines, motors or solenoids, are commonly connected in a linear array or a matrix of multiple rows and columns, as disclosed in U.S. Pat. Nos. 4,785,927; 4,712,049; and, 4,284,208. Such systems provide one or more output signals to energize a single vend producing device. While these systems may incorporate some feedback device for indicating that a vend has taken place, such do not provide means for detecting which of the vend producing devices was energized by monitoring the control signals being output.

SUMMARY OF THE INVENTION

An audit monitoring system for use with a coin operated vending system is provided. The audit monitoring system includes an interface assembly coupled to a data link between the vending machine's controller and its funds receiving and dispensing equipment, for monitoring communication therebetween. The audit monitoring system further includes a microprocessor coupled to an output of the interface assembly for (1) interpreting the monitored communications responsive to predetermined parameters, and (2) discriminating and accumulating transaction data for the coin operated vending system. Coupled to the microprocessor, there is provided a memory array for (1) storing the predetermined parameters, (2) outputting the predetermined parameters to the microprocessor responsive to an identification code input to the memory array, and (3) storing the transaction data. A power supply coupled to the interface assembly, microprocessor and memory array is provided for supplying an operating voltage thereto. The audit monitoring system also includes an input/output assembly removably coupled to the microprocessor for input of the identification code to the microprocessor and output of the transaction data therefrom.

DESCRIPTION OF THE PREFERRED EMBODIMENT

Referring to the Figures, there is shown, a vending machine audit monitoring system 10 for retrofit into any of a wide variety existing vending machines 300. As will be seen in following paragraphs, vending machine audit monitoring system 10 is specifically directed to the concept of providing a means of adding an audit monitoring capability to previously manufactured coin operated vending machines of various types which otherwise had none. Although not restricted to retrofit applications, vending machine audit monitoring system 10 is particularly adapted to interface with a large variety of different types of coin operated vending machines, adding an audit capability thereto. Audit monitoring system 10 is further adapted to interface with vending machines which vend a plurality of different products using a matrix of product dispensing mechanisms to vend a selected product, system 10 maintaining a separate count for each matrix location. In addition to being capable of interfacing with a multitude of machine types, vending machine audit monitoring system 10 also provides the capability for interfacing with different types of data retrieval terminals, communicating through either a hard wire or infrared data link, each having a different protocol, as was disclosed in the commonly owned U.S. Pat. No. 5,442,568 incorporated herein by reference.

Figure 1:
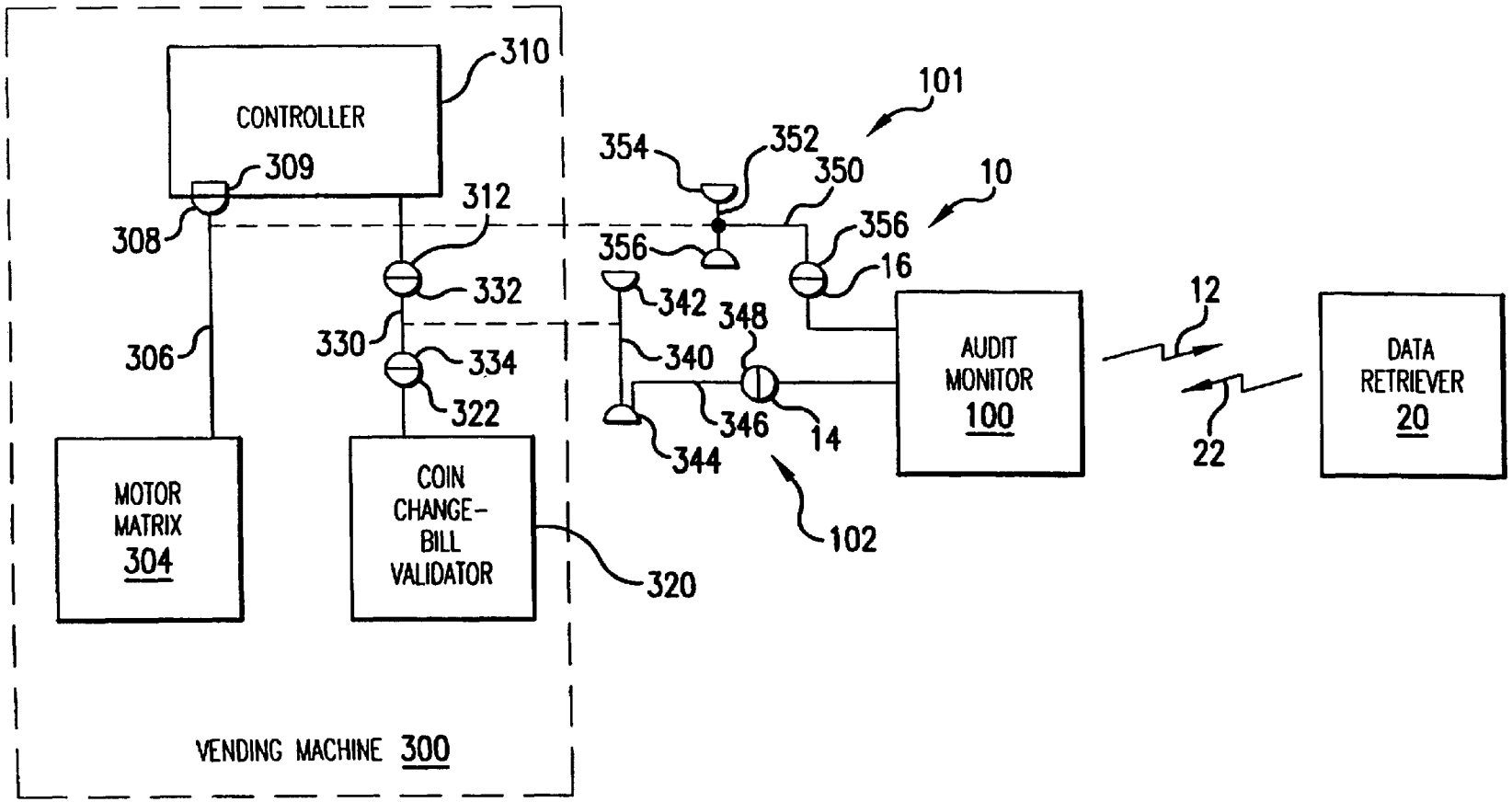
FIG. 1 is an overall block diagram for audit monitoring system 10 illustrating its retrofit interface with a vending machine 300.

Referring now to FIG. 1, there is shown, a conventional vending machine 300 of the type including therein a coin changer-bill validator assembly 320 for receiving and dispensing funds coupled to a controller 310 by a data link 330. Data link 330 may be formed by a plurality of conductors for providing bi-directional serial communications, a parallel data bus, or a combination thereof. As is typical of such vending machines, vending machine 300 is of a modular construction wherein the controller 310 includes a connector 312 for coupling to a complementary connector 332 of data link 330. Similarly, coin changer-bill validator assembly 320 includes a connector 322 for coupling with the complementary connector 334 of data link 330. Vending machine 300 may be any one of a plurality of different types of vending machines. Such different types of vending machines 300 may include those that provide one or more selectable items, each vended at the same price, or be of a more complex variety having a multiplicity of different produces available to vend, wherein each type is each priced differently, or each type belongs to one of a plurality of different price groups. This latter type of machine is commonly referred to as a multi-price machine, and the former is referred to as a single price machine. Either type of machine may include a matrix of product dispensing mechanisms 304 having a plurality of vend actuation devices, such as motors or solenoids, arrayed in a matrix to provide an efficient means of selecting the product being vended. As motors are more commonly used, matrix 304 will be referred to as motor matrix 304, but it should be understood that any dispensing mechanism used by a vending machine could be interfaced in the same manner. Controller 310 includes row and column drivers which are coupled to motor matrix 304 through a multiconductor cable 306, the cable 306 being connected to controller 310 through a connector 308.

To further complicate the variety of vending machine 300 which may be encountered, it should be noted that the coded signals utilized to transmit data between the controller 310 and the equipment utilized for receiving and dispensing funds, as represented by the coin changer-bill validator 320 assembly, may differ from one manufacturer of vending machine 300 to another. Bill validators may also differ between machines of the same general type (multi vs. single price) from the same manufacturer, thereby creating many sub-categories. Thus, there has heretofore not been a single audit system capable of interfacing with other than a single and narrow class of vending machine, and that class from only a particular manufacturer.

Vending machine audit monitoring system 10 includes an interface assembly 102 which is coupled to the vending machine data link connectors for monitoring and carrying communications between the funds receiving and dispensing equipment 320 and the vending machine controller 310, and optionally between controller 310 and motor matrix 304. The interface assembly 102 includes an adapter cable having the appropriate conductive pathways 340 coupled on opposing ends to connectors 342 and 344 for replacing the connections made by connectors 332 and 334, respectively. The conductive pathways in the link 340 are either tapped or daisy-chained through an interface cable 346 which is terminated in a respective connector 348 for coupling with a complementary connector 14 of the audit monitor assembly 100. It is therefore only necessary that the data link 330 be removed from the vending machine 300 and replaced by the adapter cable of interface assembly 102, coupling the controller connector 312 to the connector 342 and the coin changer-bill validator connector 322 to the interface connector 344.

Based on the monitored communications the coin changer-bill validator 320 and controller 310, a vend operation can be inferred. However, where it is desired to confirm that a vend has actually taken place and identify from which of many storage locations a product was dispensed, then an additional output of the controller 310 must be monitored.

For that purpose, interface assembly 102 may further include an interface or adapter cable 101.

Interface cable 101 includes the appropriate conductive pathways in a cable branch 352 coupled on opposing ends to connectors 354 and 356. Cable 101 is provided for connection between connector 308 and a mating connector 309 of controller 310. The conductive pathways of cable branch 352 are tapped by respective conductors of an cable branch 350, which is terminated in a respective connector 356 for coupling with a complementary connector 16 of the audit monitor assembly 100. That is, the conductive pathways of cable branch 350 are connected in parallel with respective conductors of cable branch 352. It is therefore only necessary that the connector 308 of the motor control signal cable 306 be disconnected from connector 309 of controller 310 and connected to connector 356 of cable 101, with the connector 354 then being connected to the controller's connector 309 in place of connector 308.

The audit monitor assembly 100 is secured within the housing of vending machine 300 and subsequently initialized utilizing the data retriever 20. Data retriever 20 is a hand-held terminal-type device which communicates with the audit monitor assembly 100. Data retriever 20 may be of a type that receives infrared signals 12 from the audit monitor assembly 100 and similarly transmits infrared signals 22 thereto. Alternately, the hand held terminal may be of the type where the data link is formed utilizing a removable hard wire connection. Obviously, the data retriever may take the form of a personal computer, lap-top, palm or pocket size computer, or a modem for coupling with a remote data processor without affecting the inventive concept of system 10. The initialization procedure includes the transmission of a code representing the type of machine being monitored. The audit monitoring assembly 100 utilizes this code for identifying predetermined parameters previously stored in memory and utilizing such in interpreting the monitored communications between the units 310 and 320.

As will be discussed in following paragraphs, subsequent to initialization, the audit monitor assembly 100 is adapted to discriminate between vending operations for items of different monetary values and accumulate a total number of operations for each of the different monetary values, as well as a total of all of the vending operations. Additionally, assembly 100 tracks how many bills are located in particular portions of the bill validator and the number of coins, and their value, which are in various portions of the coin changer, as well as the number and value of coins which have been paid out. When the motor matrix 304 is monitored, then the specific location, row and column, of each vend can be tracked and separate accumulations maintained therefor. The audit monitor assembly 100 is also capable of tracking the number of times the interior of the vending machine 300 has been accessed, as well as the time and date associated therewith, the time and date of power outages, and the time and date of data retrieval by the data retriever terminal 20.

Figure 2:
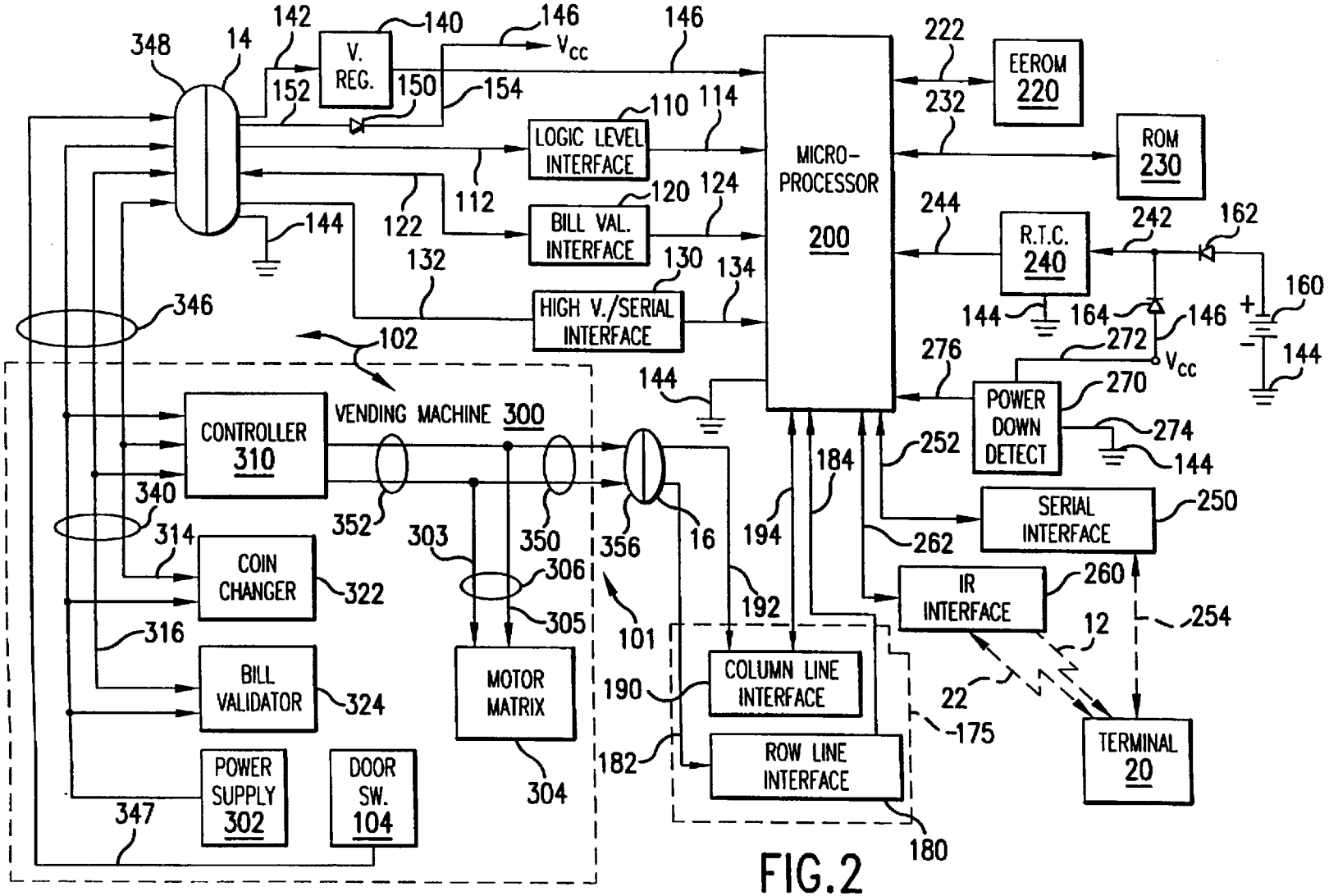
FIG. 2 is a block diagram detailing the circuit elements which form the audit monitoring assembly 100, and their interface with the vending machine 300.

Referring now to FIG. 2, there is shown, a block diagram of the audit monitor assembly 100 and its connection to the sub-assemblies of the vending machine 300. As previously described, the interface assembly 102 provides the means by which the audit monitoring assembly 100 is coupled to the various components of vending machine 300. In addition to providing the monitored signals to the audit monitor assembly 100, interface assembly 102 also provides the power for operating the circuits of assembly 100 from the power supply 302 of vending machine 300.

Interface 102 provides the necessary conductive pathways 340 to maintain the communications data link between the controller 310 and both the coin changer 322 and bill validator 324, as well as coupling from the power supply 302 to each of those subsystems. As will be seen in following paragraphs, the interface with the vending machine data link may involve more than simple paralleling of the signal pathways to provide monitoring signals to assembly 100. Although it is rare to find vending machines without bill validators, where system 10 is to be incorporated into such a machine, obviously, that connection would be omitted from the interface assembly 102. Where it is desired to accumulate data as to the number of times the interior of the vending machine 300 had been accessed, a door switch 104 is secured to the machine such that its contacts are operated whenever the door of the vending machine is opened. It is not important to the inventive concept as to whether such contact operation is from a normally closed condition to an open condition, or from a normally open condition to a closed condition, and adaptation to the circuits of audit monitor assembly 100 to use either is well within the knowledge of those skilled in the art. A pair of conductors of a cable 347 provide electrical coupling between the door switch 104 and the connector 348, as part of the cable 346 for communicating any contact operation to audit monitor assembly 100. Where the specific location from which products are vended is to be accumulated, cable 101 is interconnected between the connector 308 of the motor control signal cable 306 and controller 310 and an expansion circuit board 175 is added to the system.

The source of power for audit monitoring assembly 100 is derived from the power supply 302 of vending machine 300. The voltage supplied by power supply 302 may vary considerably, depending on the type of vending machine 300 which is to be monitored. However, the power supply voltage of a vending machine 300 will typically fall in one of two categories, either an unregulated relatively high voltage in the range of 12–16 volts, or a regulated 5 volt source suitable for use with integrated logic circuits, such as TTL logic. Interface 102 is designed such that an unregulated power supply voltage from vending machine 300 will be coupled to the appropriate pins of connector 14 for coupling the unregulated power source between the ground reference 144 and the input lead 142, through the connector 14. Input lead 142 couples the unregulated voltage to a voltage regulator 140 having an output voltage bus 146 for supplying a regulated 5 volts to all of the active devices which form the assembly 100. Although not shown, it is understood that the supply voltage $V_{cc}$ is coupled to all of the active devices of assembly 100 in a manner similar to that shown for microprocessor 200, such being coupled to the 5 volt bus 146 and the ground reference 144. Alternately, wherein the power supply of vending machine 300 provides the proper regulated voltage, such is coupled through the connector 14 to the input lead 152 for coupling with the DC bus 146 through an isolation diode 150 and the coupling line 154.

Where the controller 310 communicates with the coin changer 322 utilizing logic level signals on the data link 314, such are coupled through the respective connectors 348, 14 to the input bus 112 for coupling to the logic level interface 110. Logic level interface 110 buffers and/or conditions the logic level signals for coupling to microprocessor 200 by way of the coupling line 114. On the other hand, where vending machine 300 is of the type having a controller and coin changer which communicate at high voltage levels (greater than 5 volts) and/or by way of a serial data format, such are coupled through the respective connectors 348, 14 to the input lead 132, for input to the high voltage/serial interface circuit 130. The signals supplied to the input of the interface 130 are appropriately converted to logic level signals suitable for coupling to microprocessor 200 through the coupling line 134. Interface 130 may incorporate optical couplers as a means of achieving both signal isolation and voltage transformation, as is well known in the art. Where vending machine 300 includes a bill validator 324, the communications carried by data link 316 are routed through the connectors 348, 14 to the bill validator interface 120 through the coupling line 122. As will be seen in following paragraphs, bill validator interface 120 couples signals corresponding to those on line 122 input to microprocessor 200 through the coupling line 124, and outputs the appropriate signals to the controller 310 substantially simultaneously.

Figure 3:
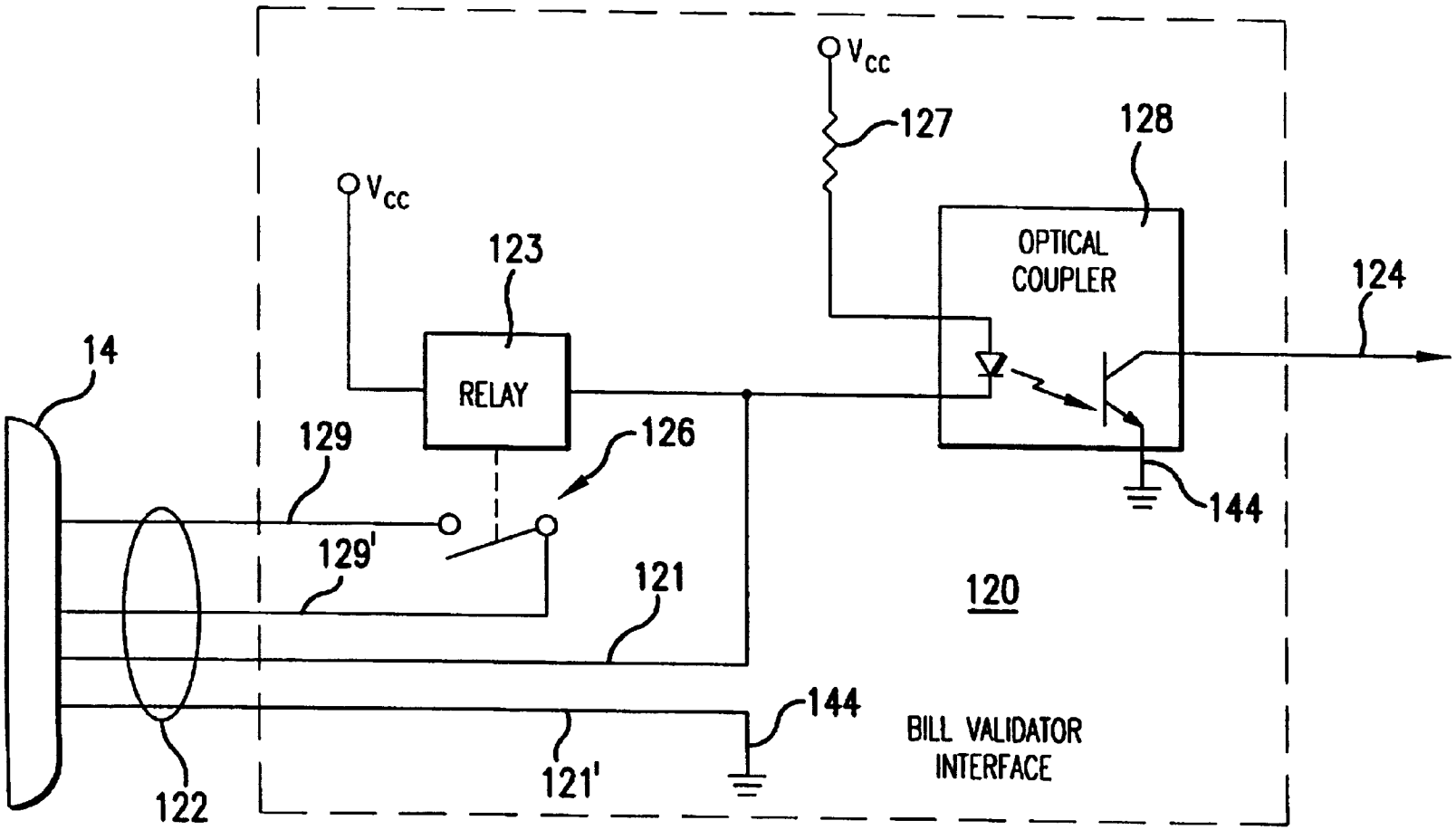
FIG. 3 is a circuit block diagram depicting the bill validator interface circuit block.
Figure 4:
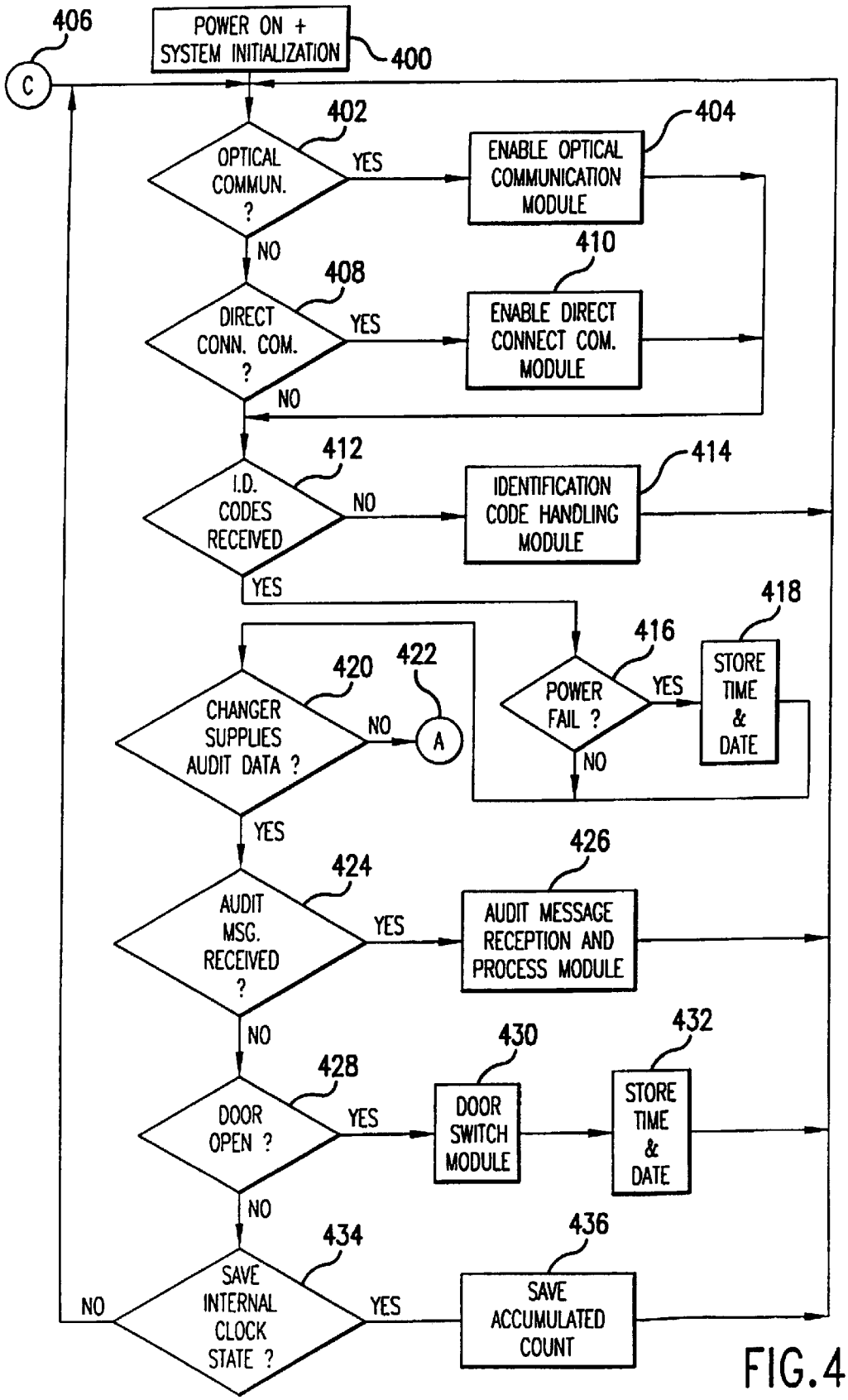
FIG. 4 is a flow chart of a first portion of the upper level software algorithm of the audit monitoring system.

Referring now to FIG. 3, there is shown, a schematic representation of the bill validator interface 120. Responsive to an input signal from the bill validator 324 coupled to line 121, such signal being in the form of relay closures or conduction of active open collector device for applying a momentary ground, from line 121', to line 121. A current then flows from the voltage supply $V_{cc}$ through the current limiting resistor 127 and the input light emitting diode of the optical coupler 128 for generating an equivalent number of optical pulses transmitted within optical coupler 128 to the output photo transistor thereof. Responsive to the optical signal received by the photo transistor portion of optical coupler 128, the signal line 124 is brought down to substantially ground potential for a period of time representative of each pulse input to optical coupler 128. Such impulses are detected at the input of microprocessor 200 and interpreted thereby, as will be described in following paragraphs. Substantially simultaneous with the generation of the signal coupled to output line 124, a relay 123 is energized responsive to each of the negative going pulses input on line 121. The relay contacts 126 thus provide an intermittent contact closure between the leads 129 and 129' which are coupled to the controller 310 of vending machine 300 for simulating the conventional output of bill validator 324 while also providing electrical isolation.

Referring back to FIG. 2, the cable 101 provides a parallel coupling of the motor matrix control signals to microprocessor 200 through the interface circuitry 180 and 190 that is provided on the expansion circuit board 175. As will be described in following paragraphs, microprocessor 200 detects the presence of expansion circuit board 175 and alters the vend operation accumulation algorithm accordingly. The control signals from vending machine controller 310 are passed through the branch 352 to the vending machine cable 306, as well as the branch 350. The control signals supplied by controller 310 provide an output on one of a plurality of row lines, and another output on one of a plurality of column lines. The column input signals 192 are coupled to the column line interface circuit 190, which detects which of the plurality of column lines has a signal impressed thereon. Responsive to detection of a control signal, an appropriate output signal 194 is provided to microprocessor 200. Similarly, an input 182 is provided to the row line interface circuit 180, providing coupling of all of the row lines thereto. The row line interface circuit 180 similarly detects which row line has been selected by controller 310, and provides an output to microprocessor 200 through the line 184.

Figure 7:
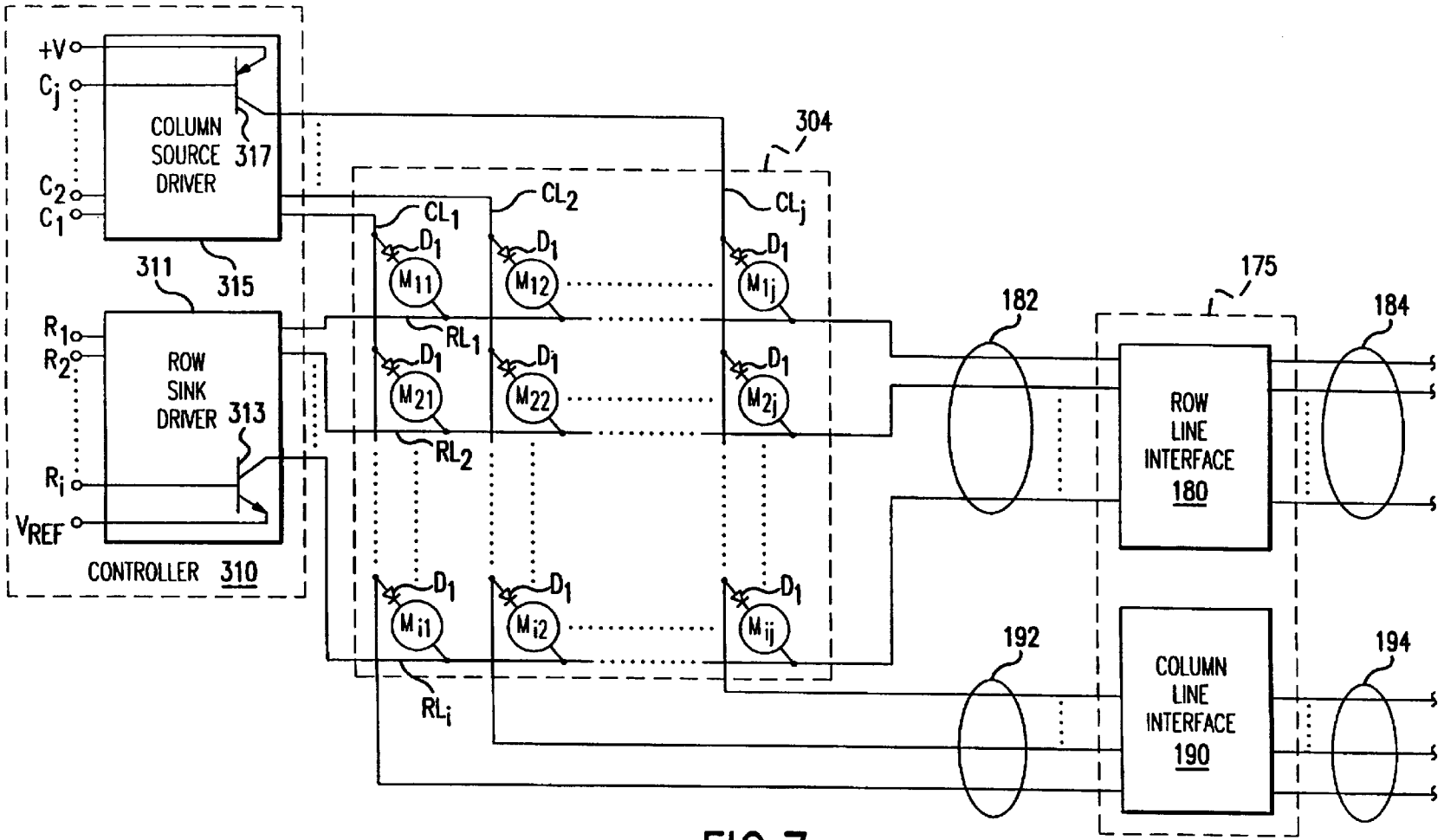
FIG. 7 is a circuit block diagram depicting interface with the motor matrix of a vending machine.

To further illustrate the motor matrix interface, reference is now made to FIG. 7. As previously discussed, the control signals for operating one of a plurality of vend producing devices of matrix 304 is provided by controller 310. Controller 310 includes a row sink driver 311, for sinking current from a selected one of a plurality of row lines $RL_1$, $RL_2$, . . . , $RL_i$. Row sink driver 311 includes a plurality of switching devices, which may be transistors 313, for coupling a respective row line to a voltage reference ($V_{REF}$) responsive to one of a plurality of row input signals $R_1$, $R_2$, . . . , $R_i$. Although one transistor 313 is illustrated, it should be understood that each of the input row selection signals $R_1$–$R_i$ are coupled to an individual transistor, the emitters of all of the transistors being coupled to the voltage reference potential.

Likewise, the controller 310 includes a column source driver 315, the column source driver including a plurality of switching devices, such as transistor 317 for coupling a source voltage (+V) to one of a plurality of column lines, responsive to a column select input signal $C_1$, $C_2$, . . . , $C_j$. While only one switching transistor 317 is shown, it should be understood that each of the column select input lines $C_1$–$C_j$ are coupled to a respective transistor 317, and each of the transistors 317 having an emitter coupled to the positive voltage source (+V) so that one column line $CL_1$, $CL_2$, . . . , $CL_j$ is coupled to the voltage source responsive to a respective column select signal. The aforesaid arrangement is common practice in prior art vending machines, as shown in U.S. Pat. No. 4,284,208, but may also be a linear array of vend producing devices, as shown in U.S. Pat. No. 4,712,049. However, the linear array may be considered to be simply a matrix with one row and a plurality of columns. It should be understood that the driver circuits 311 and 315 are vending machine circuits, not part of the instant invention, and their depiction and description is strictly exemplary.

The row line interface circuit 180 is provided with an input 182 comprising a plurality of conductors, each conductor representing one of the row lines $RL_1$, $RL_2$, . . . , $RL_i$. Thus, when the row sink driver 311 provides an output, on a selected row line, that row line is brought from a floating condition to the reference potential, usually ground. Row line interface circuit 180 detects the change in state of the selected row line, and provides a corresponding output on one line of the output 184. Controller 310 identifies the particular vend producing device selected by outputs on both one row line and one column line. The selected one of the plurality of column lines $CL_1$, $CL_2$, . . . , $CL_j$ is brought from a floating condition to the potential of the positive voltage source (+V), by conduction of the appropriate transistor 317. In addition to row line interface circuit 180, expansion circuit board 175 includes column line interface circuit 190. Column line interface circuit 190 includes an input 192 having a plurality of conductors respectively coupled to the plurality of column lines, for input of the source voltage of the selected column line thereto on a respective conductor. Column line interface circuit 190 detects the change in condition on a column line $CL_1$, $CL_2$, . . . , $CL_j$, and provides a corresponding output on one of the output lines 194.

As the source voltage is supplied to a selected one of the column lines, all of the vend producing devices, which may be motors $M_{11}$, . . . , $M_{ij}$, coupled to the particular column line are coupled to the source voltage. Thus, if the source voltage is coupled to column line $CL_2$, then the source voltage will be supplied to each of the motors $M_{12}$, $M_{22}$, . . . , $M_{i2}$. The source voltage is supplied to those motors through respective isolation diodes $D_1$, *each having an anode* coupled to a respective column line and a cathode coupled to the respective motor. The opposing end of each motor is coupled to a respective row line. As each of the unselected row lines are in a floating condition, the motors $M_{12}$, $M_{22}$, . . . , $M_{i2}$ will not be energized unless the respective row line to which they are coupled is coupled to the reference potential. Thus, if row line $RL_2$ is selected, only the motor $M_{22}$ will be operated, to thereby vend a selected product. Row interface circuit 180 will detect the selection of row line $RL_2$ by detecting its change of state to the reference potential. The column line interface circuit 190 will detect the selection of column line $CL_2$ by its change of state to the source potential, both the row line interface circuit 180 and the column line interface circuit 190 provide appropriate outputs on output lines 184, 194 for input to microprocessor 200, the microprocessor 200 utilizing the row and column input thereto to identify the location of the product vended.

Figure 9:
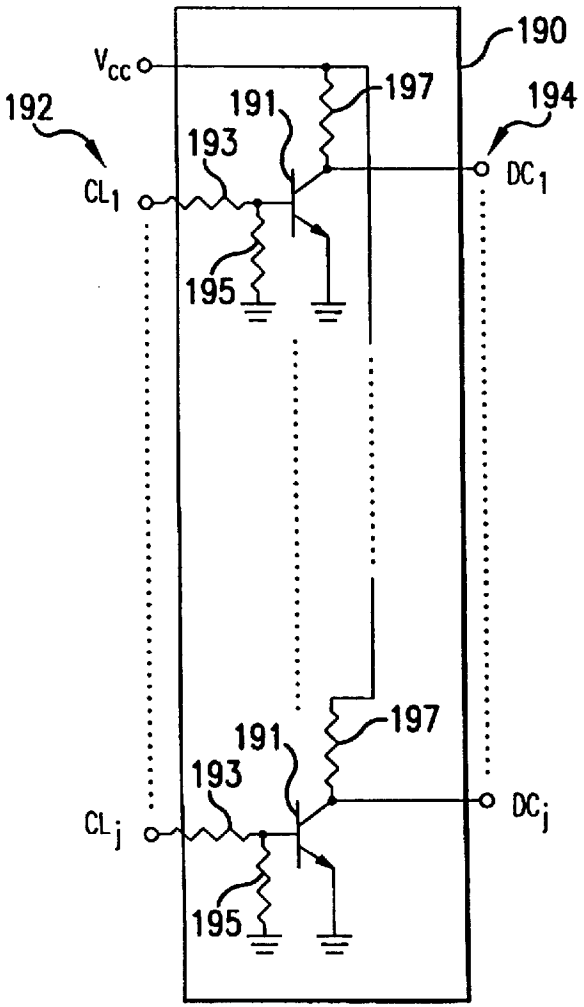
FIG. 9 is a schematic diagram of a column interface circuit of the audit monitoring system.
Figure 11:
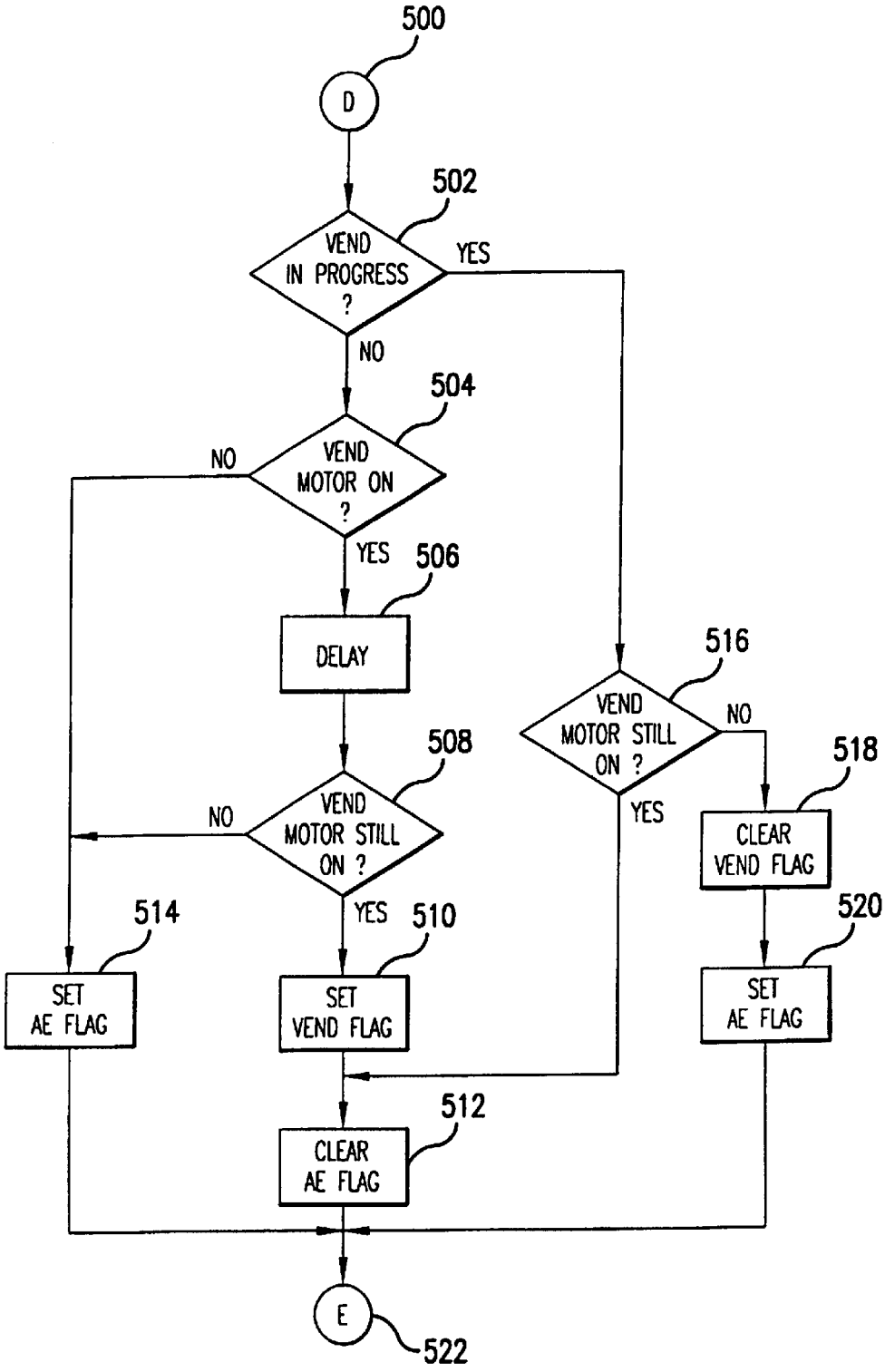

Referring now to FIG. 9, there is shown, the column line interface circuit 190. Column line interface circuit 190 includes a plurality of transistors 191 each coupled to a respective column line $CL_1$–$CL_j$ through the input lines 192 and include an output line for providing a data signal $DC_1$–$DC_j$ to microprocessor 200 through the output lines 194. Each transistor 191 includes a load resistor 197 coupled between the transistor's collector and the positive logic voltage source ($V_{cc}$). The emitter of each transistor 191 is coupled to the ground reference potential, as is one end of a biasing resistor 195. The opposing end of biasing resistor 195 is coupled to the base of the respective transistor 191. A current limiting resistor 193 is coupled between the input terminal of the interface circuit 190 and the base of the respective transistor 191. Resistors 193 and 195 together define a voltage divider, the values of which are selected to appropriately turn on the respective transistor 191 when the column line to which the transistor is coupled is switched from a floating condition to the source potential. When the transistor 191 is not conducting, the load resistor 197 couples the source potential to the respective output $DC_1$–$DC_j$. The one transistor 191 which is turned on when a control line is selected, pulls the respective output line to approximately ground potential, thereby identifying to microprocessor 200 which of the column lines has been selected. Where the number of column lines is very large, the output lines to microprocessor 200 may be encoded, as in binary fashion wherein sixteen column lines can be represented by four binary output lines. As such encoding logic circuits are well known in the art, and commercially available, it is not believed necessary that such be described in any further detail.

Figure 10:
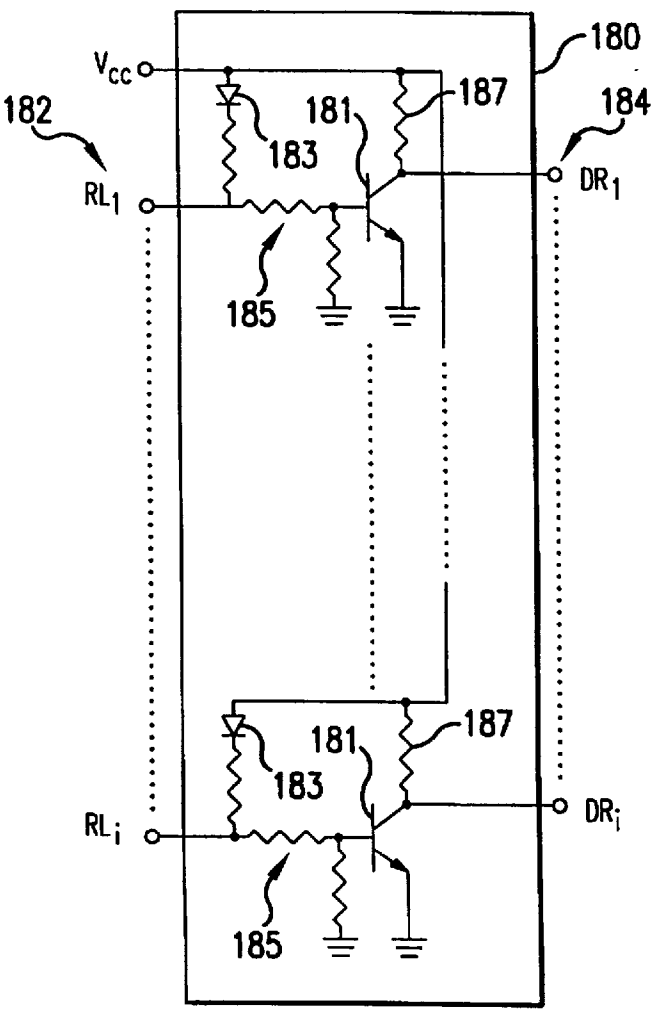
FIG. 10 is a schematic diagram of a row interface circuit of the audit monitoring system; and, FIG. 11 is a flow chart of a fourth portion of the upper level software algorithm of the audit monitoring system.

As shown in FIG. 10, the row line interface circuit 180 includes a plurality of transistors 181 each coupled to a respective row line $RL_1$–$RL_i$. Each of the transistors 181 is coupled to a load resistor 187 coupled between the collector of the transistor and the positive logic voltage source ($V_{cc}$). The emitter of each transistor 181 is coupled to the ground reference potential. Each of the transistors 181 is biased to an "on" state by means of an isolation diode 183 and a three resistor bias network 185. The diode 183 has an anode coupled to the positive source voltage and a cathode coupled to the biasing network 185, the biasing network 185 being referenced to the ground reference potential by a resistor coupled between the base of transistor 181 and the ground potential. Since an unselected row line is in a floating condition, each transistor 181 coupled to an unselected row line will be in an "on" state, to thereby provide an output at approximately ground reference potential. As a selected row line is coupled to the voltage reference potential, which is the ground reference potential, the respective transistor 181 coupled thereto will be in an "off" state, thereby providing an output signal which is at the source voltage potential, by virtue of the coupling of the collector to the positive source voltage through the respective resistor 187. Thus, microprocessor 200 will have the appropriate row line identified by a positive voltage output on one of the output lines $DR_1$–$DR_i$ of the output 184. Where the number of row lines for a particular application is very large, such may be encoded in binary fashion, as previously described, utilizing similar commercially available circuit devices, and thus there is no need to detail that circuit arrangement.

When the expansion circuit board 175 is not installed, column line interface circuit 190 and row line interface circuit 180 will not be connected to microprocessor 200, and those input connections will be floating. When column interface circuit 190 is connected to microprocessor 200, microprocessor 200 will see each of the respective inputs at the source voltage, when the respective column lines are unselected. Microprocessor 200 will also see each of the respective row line data inputs from row interface circuit 180 at the reference potential, when the respective row lines are unselected. Such provides sufficient indicia to distinguish the presence of expansion circuit board 175 from its absence.

Figure 8:
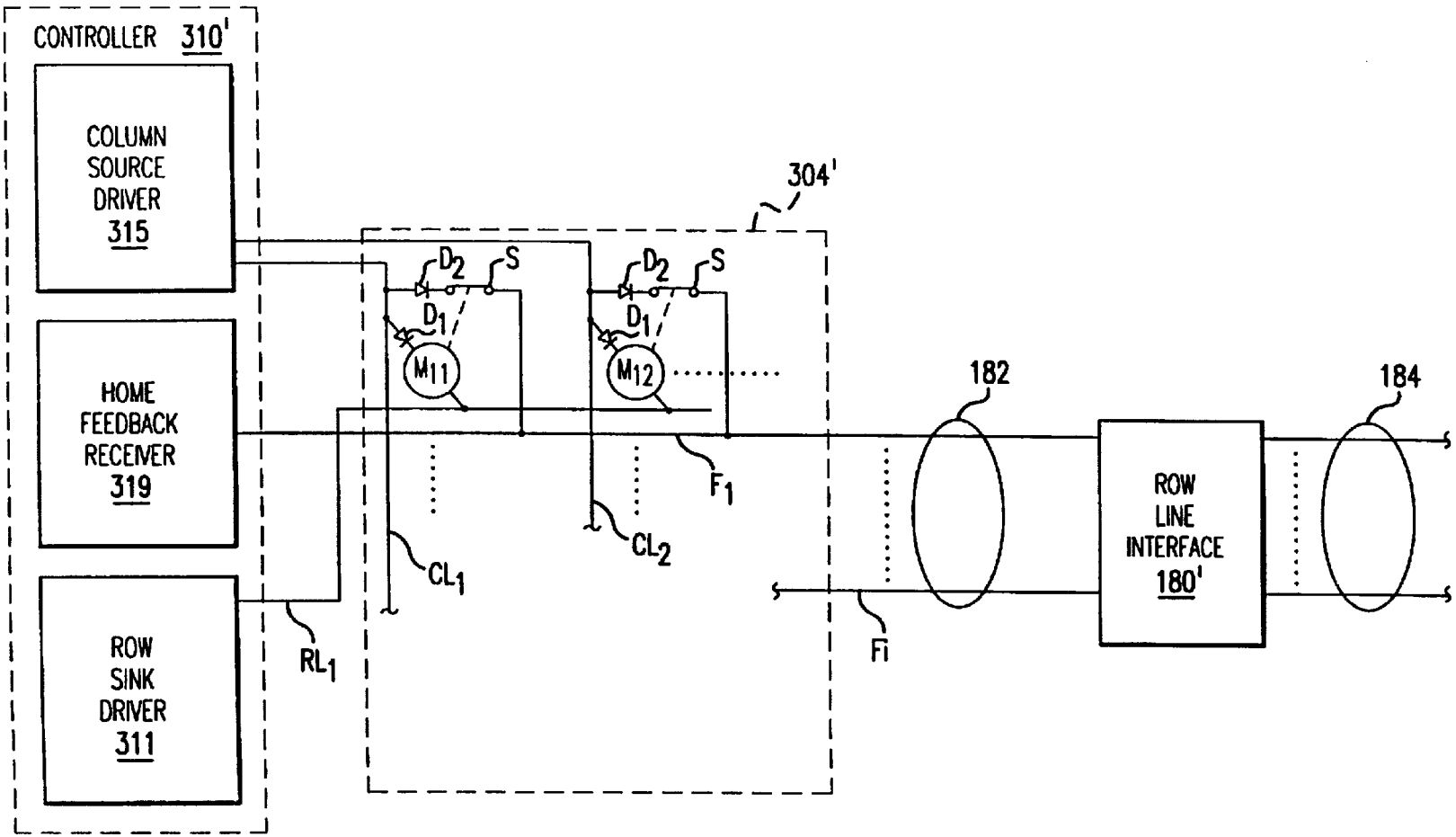
FIG. 8 is a circuit block diagram depicting an alternate configuration of the interface with the motor matrix of a vending machine.

In some existing vending machines, the motor matrix includes a cam operated switch associated with each of the product dispensing motors, as shown in FIG. 8. The motor matrix 304' includes an array of motors, just as was shown in FIG. 7. The controller 310' includes a column source driver 315 which provides the positive voltage to a selected column line, and a row sink driver 311 which couples a selected row line to the voltage reference (ground) potential. Where this vending machine circuit differs, is the inclusion of the cam operated switch S associated with each of the motors $M_{11}$–$M_{ij}$ (only motors $M_{11}$ and $M_{12}$ being shown for simplicity), each of the switches being coupled to the associated column line of the corresponding motor through an isolation diode $D_2$. The opposing end of switch S is coupled to a respective feedback line $F_1$–$F_i$ for coupling to a home feedback receiver 319 within the controller 310'. Therefore, each row of motors in the array in addition to having a row line associated therewith has a feedback line, such that the associated switches for each motor in a row are connected to a common feedback line, there being as many feedback lines as there are rows in the matrix. The feedback signal provided by the switch S indicates to the controller 310', through the home feedback receiver 319, that the associated motor has reached the "Home" position. Since only one column line in the matrix is energized at any one time, the fact that all of the switches in a single row are coupled to a common line, will not cause any interference, since voltage will only be supplied to one of the switches in any given row. The column line interface for system 100 is not shown in FIG. 8, as its connection is identical to that shown in FIG. 7. However, the row line interface 180' is connected to the feedback lines $F_1$–$F_i$, as opposed to the actual row lines. Thus, the input 182 to row line interface 180' is the source potential supplied on one of the feedback lines, the change of state therefrom being detected by interface circuit 180' and output on lines 184. Since circuit 180' must detect the source voltage, as opposed to the reference potential, the same circuit arrangement as is used for the column line interface 190, shown in FIG. 9, and previously described, may be used for circuit 180'.

Thus, by means of the interface assembly 102, being adapted to appropriately couple the internal signals of vending machine 300 to the connector 14 of the audit monitoring assembly 100, and the connector 16 thereof when the motor matrix is being monitored, the operation of vending machine 300 can be monitored to collect audit data therefrom.

While the operational signals of vending machine 300 may be easily coupled to audit monitor assembly 100, in the aforesaid manner, to microprocessor 200, the interpretation of those signals is complicated by the fact that the sequence and timing of such signals varies from one manufacturer's vending machine 300 to another and from one manufacturer's type of machine having one type of bill validator to another of the same manufacturer's machine having a different type of bill validator. As a simplified example, one vending machine 300 may use a bill validator 324 having an escrow feature, that is, a received bill that has been determined by the validator to be valid legal tender, is held in an escrow position. From the escrow position it may be returned, if no vending selection is made, or accepted upon the user making his article selection and the machine vending the product. In such case, the validator 322 outputs a pulse upon initial receipt of a valid bill and a second pulse when the bill is accepted and moved from the escrow position. Whereas, a non-escrowing type of bill validator accepts all valid bills, providing a refund when no vend is made through the coin changer. Thus, for the non-escrowing type of bill validator only a single pulse is output for each potential vend operation, and the coin changer will be signaled no vend operation is carried out. Still other types of validators are multi-value devices which identify the value of the bill input thereto and signal such by output of a number of pulses representing that value. In such a system, acceptance of a five-dollar bill will be signaled by the output of a pulse train comprising five consecutive pulses. Microprocessor 200 must be able to distinguish between these different signal protocols in order to properly account for the transactions of a particular vending machine 300 to which it has been coupled.

Referring back to the block diagram of FIG. 2, microprocessor 200 is shown coupled to a read only memory 230 by means of the coupling line 232, representing the necessary data, addressing and control signal pathways for bi-directional communication therebetween. Similarly, microprocessor 200 is coupled to an electrically erasable programmable read only memory 220 by means of the coupling line 222. Read only memory 220 may be any programmable type of non-volatile memory, either internal or external to the microprocessor without departing from the inventive concept. Read only memory 230 stores the software which controls the operation of microprocessor 200, as well as the many different parameters which may be required for microprocessor 200 to interpret the signals monitored through the interface assembly 102, as previously discussed. Responsive to the microprocessor's receipt of an identification code during the initialization procedure, performed during the installation of the audit monitoring assembly 100 into the vending machine 300, software flags are set such that the appropriate parameters are transferred from read only memory 230. These parameters may be used in processing input signals as they are read, or transferred to the non-volatile memory 220 for subsequent use in the software routines used by microprocessor 200 in interpreting the monitored communications of vending machine 300. It is not important to the inventive concept which method is used, however, it is of particular importance that the many parameters for the different vending machines be stored in assembly 100 and selectively made available responsive to entry of an identification code. All of the audit data and time stamping information is stored in the erasable read only memory 220 for subsequent transfer to a data retrieval terminal 20.

Microprocessor 200 is coupled to a pair of output interface circuits 250, 260 by respective coupling lines 252, 262. Interface circuit 250 is a serial interface for bi-directional communications to a retrieval terminal 20. Such communications being through a cable 254 which is removably engageable with an appropriate connector mounted to the housing which encloses the audit monitoring assembly 100 or a cable extending therefrom. The communications carried by the cable 254 may use an industry standard protocol known as the Direct Connect Interface Standard, although microprocessor 200 may be programmed to receive and transmit any desired protocol. Interface 260 is an optical interface for transmitting and receiving signals within the infrared portion of the electromagnetic spectrum. The protocol for data transmitted through this optical interface may also be an industry standard, or one specially tailored to a particular type of terminal 20. Like the identification codes utilized for "personalizing" audit monitoring assembly 100 to a particular vending machine 300, the output interface protocol can be similarly tailored utilizing a code input when the system is initialized, utilizing a default protocol for the initial communications. Alternately, the protocol used for transmission to assembly 100 can be identified by microprocessor 200, and then utilized for transmission of data output thereby.

Microprocessor 200 may also receive an input from the real time clock 240, by means of coupling line 244, which may be included in the system to provide time stamps in association with particular events, and thereby improve the audit capabilities of system 10. Real time clock 240 is powered from voltage supplied to the power supply input lead 242 of real time clock 240, such voltage normally being supplied from the power supply bus 146 through an isolation diode 164. However, real time clock 240 is also coupled to a backup battery 160 through an isolation diode 162. Thus, if power is interrupted to the vending machine 300, the real time clock 240 will remain energized from the battery 160, with the diode 164 preventing flow of current from battery 160 to any other device coupled to the power supply bus 146. Similarly, the diode 162 prevents any flow of current from the power supply bus 146 to the battery 160, which is desirable for applications utilizing lithium cells. However, in cases where nickel cadmium batteries are utilized, the diode 162 may be eliminated or bypassed with a current limiting resistor to provide charging current to maintain the cells in a fully charged state between power interruptions.

Real time clock 240 provides the capability for identifying a time and date of various operations and transactions of vending machine 300 and assembly 100. Events such as door switch operations, in addition to being simply counted, may be tagged with the time and date of the occurrence, allowing a vending machine owner to identify when the vending machine was accessed to replenish the goods being vended and/or removal of cash therefrom, irregardless of whether audit data is retrieved at such time. The time and date may also be stored at the restoration of power, subsequent to a power failure. This power failure data, the frequency of occurrences and their time of day/date, can be utilized in assessing whether power is being deliberately removed in order to bypass the audit function of system 10. This feature is enhanced by incorporation of the power down detection circuit 270. Detection circuit 270 outputs an interrupt to microprocessor 200 on line 276 when the power supply voltage falls below a predetermined threshold value, indicating that a power outage is imminent. Detector circuit 270 is coupled to the $V_{cc}$ supply by line 272 and the ground reference 144 by line 274.

Audit monitoring assembly 100 uniquely utilizes microprocessor 200 to detect a power failure, and in combination with real time clock 240 determines when the power was restored and the length of time that power was out. As will be described in following paragraphs, a clock counter is implemented in the software of microprocessor 200, which may be utilized for timing events in applications not requiring the accuracy of real time clock 240, which would be excluded from assembly 100 in such applications, as could power down detector circuit 270. In the absence of power down detector circuit 270, the internal clock counter and use of two bytes of memory provide a unique means for identifying and timing power failures without the need for additional hardware to identify a low voltage condition.

The internal clock counter is incremented at two minute intervals, with the new accumulated total stored in ROM memory 220 every hour, or any other time increment desired depending on whether memory write cycles are to be limited. Since microprocessor 200 is not provided with any battery backup, its processing stops coincident with a loss of power, and upon power restoration must reinitialize variables, counters and the like. Thus, whenever power is restored, the internal clock counter is reset to the last value that was stored in ROM 220. Power failures are identified by the state of a pair of bytes of memory on reinitialization of microprocessor 200. Part of the initial start-up processing is to store a known bit pattern in each of two bytes of memory. When the system is reinitialized after a power outage, those two bytes will contain random bit patterns, thereby indicating that a power failure had occurred. Responsive to identification of such an abnormal condition, microprocessor 200 increments a power outage count stored in ROM 220, and reads the real time clock 240, if such is present, to identify the time and date of power restoration, and stores such data in non-volatile memory 220. If real time clock 240 is not present, microprocessor 200 uses the last internal clock counter accumulation which had been stored in non-volatile memory 220 for the power failure time stamp, which represents, on average, the nearest half hour time period prior to the power failure. The difference between that last time period established by the internal clock counter and the time-of-day read from the real time clock 240 establishes the approximate length of time that power was out. Such is more accurately determined when the occurrence of a power failure is identified by the power down detection circuit 270. Obviously, the frequency of power outages, the time that they occur and length of such occurrence provides important security data to the owner of vending machine 300.

Referring now to the flow charts of FIGS. 4–6 and 11, there is shown an outline of the upper level software flow utilized in microprocessor 200. As is typical in microprocessor controlled systems, upon energization, initialization procedures are initiated. As indicated in block 400, such initialization is carried out responsive to energization. The initialization block represents such operations as resetting timers, enabling interrupts and clearing variables. From block 400, the flow passes to the decision block 402, wherein it is determined whether the optical interface has received any communication. If optical communications have been received, the flow passes to block 404, wherein the optical communications module, a separate software sub-routine, is enabled. Subsequent to completion of optical communications, carried out by the sub-routine called from block 404, the flow would pass to decision block 412. If no optical communication had been received, flow passes from decision block 402 to decision block 408, wherein it is determined whether any communication is received through the hardwire serial interface. If such communication has been received, flow passes to block 410, wherein the direct connect communications module is called. Subsequent to completion of any such communications, flow passes from the block 410 to the decision block 412, as does the flow from decision block 408 if no communication was received by the serial interface. Decision block 412 tests whether the identification codes for vending machine 300 have been previously received, and if not, flow passes to the sub-routine called in block 414. Since the proper interface with vending machine 300 cannot be achieved without the appropriate identification codes being entered, the flow from block 414 passes back to decision block 402 to form a continuous loop until the identification codes have been received. Obviously, an indication (such as a message output to terminal 20) that the code must be entered is provided by the system. Alternately, the system could begin with default or random parameters selected, such being subsequently changed to properly interface with a specific machine. The identification code could be entered using a hard wired switch, such as a multi-pole switch, as an alternative to input from terminal 20, in which case the switch setting will determine the parameters selected.

Once the identification codes for vending machine 300 have been received, or if such had previously been entered, flow passes from decision block 412 to decision block 416. Decision block 416 tests whether a power failure had occurred since the last time through the main processing loop. As was previously described, whether a power failure had occurred or not is determined by the state of the internal clock/counter in combination with the state of audit data retrieval (whether such has just occurred). If a power failure has been identified, the flow passes from decision block 416 to block 418, wherein power failure housekeeping is performed, such as storing the time and date of the power failure, reading the last stored output of the internal clock/counter, and determining the duration of the power outage determined and storing that determination. From block 418 flow passes to decision block 420, as does the flow from decision block 416 if no power failure is detected. In block 420, it is determined from the previously entered I.D. codes whether vending machine 300 is a vending machine where audit data is supplied by the coin changer.

If the vending machine 300 is of the type where the changer supplies audit data, the flow passes to decision block 424, wherein the vending machine interface is tested to determine whether an audit message (communication relative to operations of the vending machine which are accumulated by the audit system) has been received from the vending machine hardware through the interface circuitry of assembly 100. If such audit message was received, flow passes from block 424 to block 426 wherein the sub-routine for handling the audit message and processing the data is called. From block 426 the flow loops back to decision block 402. If no audit message is currently being received, flow passes from block 424 to decision block 428, wherein it is tested whether the vending machine door has been opened, by monitoring the installed door switch, as has previously been described. If the door switch has operated, flow passes to block 430, wherein the door switch sub-routine is called. From block 430, the flow passes to block 432, wherein the time and date from the real time clock is read and stored in the non-volatile memory. From block 432, flow passes back to decision block 402. If the door has not been opened, flow passes to decision block 434. Decision block 434 tests to determine when the last time the internal clock counter state had been saved. If this time period is less than two minutes, the flow passes from block 434 back to decision block 402. However, if the time period is not less than two minutes, the flow passes from block 434 to block 436, wherein the accumulated count of the internal clock/counter is saved in non-volatile memory. From block 436 the flow passes back to block 402.

Figure 5:
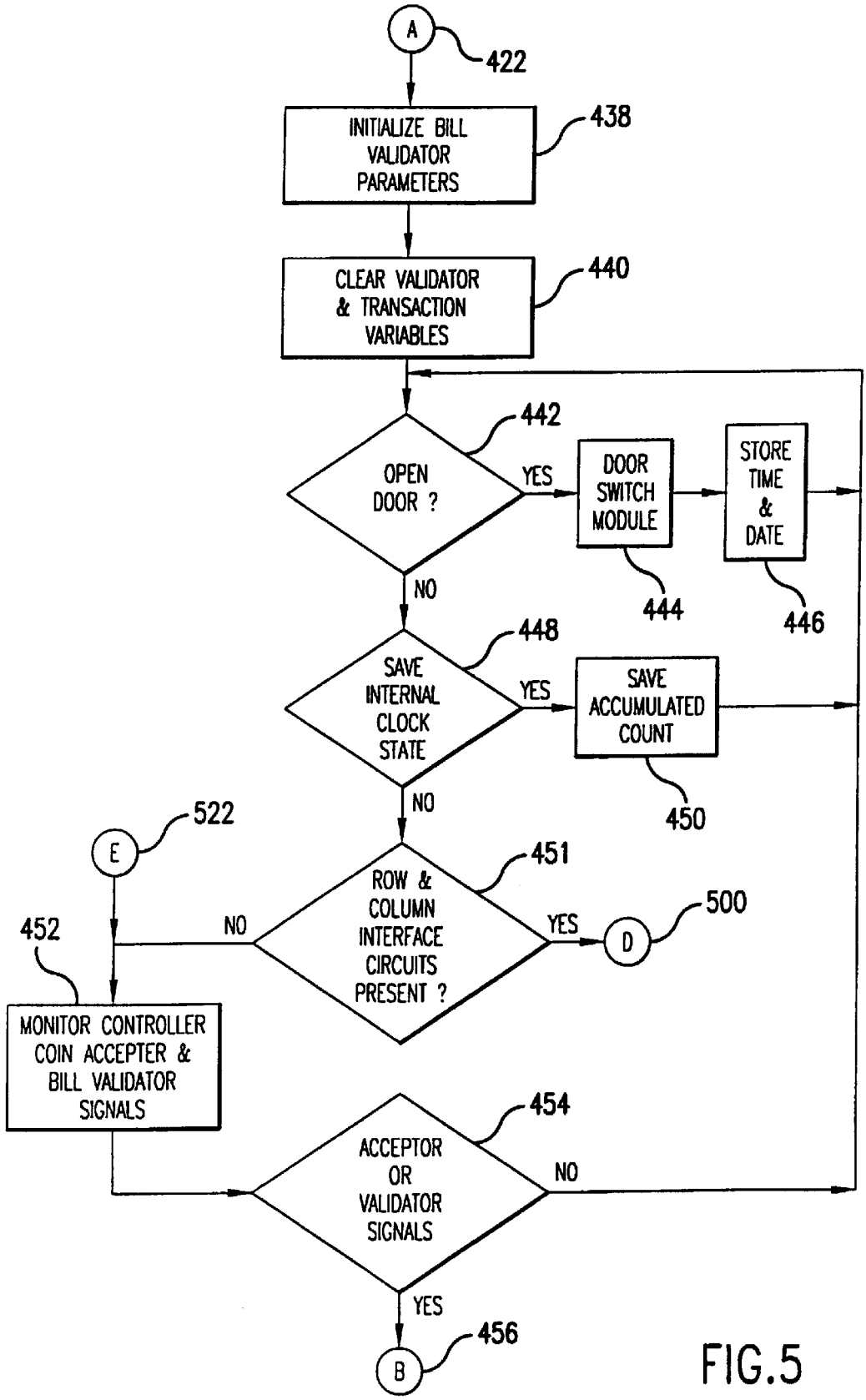
FIG. 5 is a flow chart of a second portion of the upper level software algorithm of the audit monitoring system.
Figure 6:
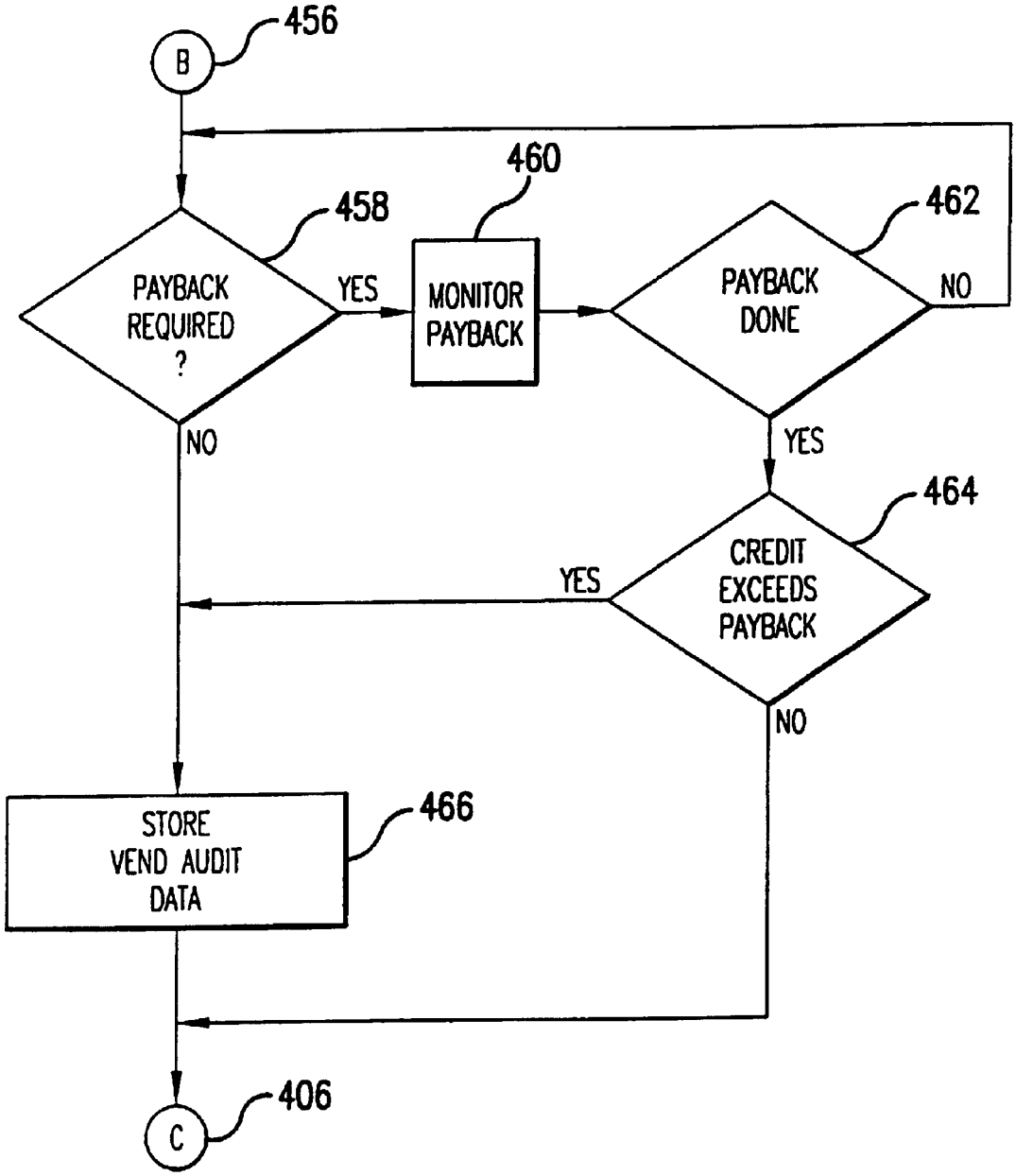
FIG. 6 is a flow chart of a third portion of the upper level software algorithm of the audit monitoring system.

If in decision block 420 it is determined that audit data is not provided by the coin changer, the flow passes through connector 422 to the bill validator initialization routine indicated by block 438 of FIG. 5, as the bill validator, coin acceptor and controller must each be monitored to ascertain the audit data. Initialization of the bill validator parameters includes the setting of particular flags in the software for translating the signals which pass between the bill validator 324 and controller 310 of vending machine 300. These parameters are selected responsive to the identification codes entered when the system was first initialized. From block 438, flow passes to block 440 wherein the particular variables utilized for tracking the bill validator operation and vending transactions are cleared. From block 440 flow passes to decision block 442, wherein it is tested whether the vending machine door has been opened. If the door switch indicates that the vending machine door has been opened, flow passes to block 444 wherein the door switch module is called and the appropriate incrementing of counters is accomplished. From block 444 flow passes to block 446 wherein the time and date is read from the real time clock and such is appropriately stored. From block 446 the flow loops back to decision block 442. If the door has not been opened, or has subsequently been closed, flow passes from block 442 to decision block 448. As in block 434, previously described, block 448 tests to determine whether two minutes has passed since the last time the internal clock counter state had been saved. If the two minute time period has lapsed, then flow passes to block 450 wherein the accumulated count is saved. From block 450, flow loops back to decision block 442. If less than two minutes has elapsed, flow passes from block 448 to decision block 451.

Decision block 451 determines whether the expansion board 175 is present by testing whether the inputs for the row interface circuit 180 and column interface circuit 190 are not floating. As the microprocessor inputs used by the row interface circuit 180 and column interface circuit 190 are floating when such are not present, their presence is detected by the presence of either of the two logic levels at the microprocessor inputs. If the row and column interface circuits are present, flow passes through connector 500 to decision block 502, shown in FIG. 11. Block 502 tests whether a Vend Flag is set. If the Vend Flag is not set, indicating no vend motor is energized, flow passes to decision block 504 which tests whether any of the product dispensing mechanisms are energized. If none are, flow passes to block 514. Block 514 sets the Accept Enable (AE) Flag. The AE Flag is used by other processing routines and when set identifies the source of the vend operation determination as being determined by the transactions of the coin changer and/or bill validator. After the AE Flag is set, flow passes through connector 522 to block 452, shown in FIG. 5.

If in decision block 504 it is determined that a product dispensing mechanism is energized, flow would then pass to block 506. Block 506 is a time delay that halts processing for a predetermined time period, approximately 0.2–0.5 seconds. After the delay, the flow passes to block 508 where it is tested whether the product dispensing mechanism is still energized. By means of the delay and retest, false responses to transient conditions, such as a motor being jogged during input of a product selection by a user, are eliminated. If no energization is detected in block 508, flow passes to block 514 and then to connector 522. However, if energization is detected in block 508, flow passes to block 510.

In block 510, the Vend Flag is set to indicate the a vend operation is in progress. Thus, on the next program cycle when this portion of the program is run again, block 502 will detect the Vend Flag as having been set, and the logic will then proceed accordingly. After setting the Vend flag, flow passes to block 512, where the AE Flag is cleared. Clearing of the AE Flag prevents other routines from identifying vend operations from the monetary transaction data, which instead will be identified from the set Vend Flag and the identification of the particular matrix location of the product dispensing mechanism energized. Subsequent to clearing of the AE Flag, flow passes through connector 522 to block 452.

Where block 502 detects the Vend Flag as having been set, flow would pass to block 516 which tests whether the product dispensing mechanism is still energized. If it is, the vend operation is still in progress and flow will pass to block 512 and continue as already described. If the product dispensing mechanism is no longer energized, such indicates that the vend operation has been completed, and flow passes to block 518, where the Vend Flag is cleared. From block 518, flow then passes to block 520 where the AE Flag is set, and then to block 452 through connector 522.

Referring back to FIG. 5, If the row and column interface circuits are not present, flow passes from block 451 to block 452, as does the flow from connector 522. In block 452, the activity of vending machine 300 is monitored, identifying operation of the controller, coin acceptor and bill validator, essentially reading from the interface to determine whether any activity is transpiring. Where the row and column interface circuits are present and a vend operation has been identified (AE Flag cleared), as has been described, the vend operation is identified by the energization of one of the product dispensing mechanisms and the matrix location thereof is identified to provide for separate accumulation of vend operations, by matrix location. The matrix location of a specific product dispensing mechanism being determined from the signal supplied to microprocessor 200 from the row and column interface circuits 180 and 190. Where the row and column interface circuits have been identified as not being present (AE Flag set), the vend operations are determined from the signal transmitted between the vending machine's controller and its coin changer 322 and/or bill validator 324. Under that condition, a vend operation is determined from an analysis of the monetary transaction taking place, the amount of money deposited less the amount returned. Thus, even if the row and column interface circuits are present, but for some reason are inoperative to detect energization of a product dispensing mechanism (AE Flag will be set), a vend operation will still be accumulated, just not identified to a particular matrix position.

From block 452, flow passes to block 454, wherein it is tested whether activity between the controller 310 and the coin changer 322 or bill validator 324 has occurred. If no activity has occurred, flow passes from block 454 back to block 442. However, where activity is detected, flow passes from block 454 to block 458 of FIG. 6, through connector 456. In block 458, it is determined whether the controller 310 has indicated that cash be paid back to the customer through the coin changer 322 or bill validator 324 (return the escrowed bill). If such signals had been detected, flow passes from block 458 to block 460. In block 460, the payback activity of the vending machine is monitored, with flow then passing to decision block 462. In block 462 it is tested whether the payback command from the controller 310 has been carried out by the coin changer or bill validator. If such had not yet been carried out, the flow passes back to decision block 458 to form a loop which continues until the payback is complete. Upon completion of the payback, the flow passes from block 462 to decision block 464. In block 464, it is determined whether the customer has received a full refund, or only change from a vending of an item or items. If the customer had received a full refund, flow passes back to block 402 of FIG. 4 through connector 406, since no vend has occurred. However, if the customer received only change, flow passes to block 466. In block 466, the vend audit data, which may comprise the cost of the item, the amount tendered to the machine, the matrix location of the product dispensing mechanism energized, and the change dispensed therefrom, are stored. Obviously, the real time clock 240 may be utilized to time and date stamp the purchase if such data were desired. Subsequent to storage of the vend audit data in block 466, flow passes back to block 402 of FIG. 4 through connector 406 to repeat this process.

It can thus be seen, system 10 provides a unique ability to interface with a wide variety of existing vending machines to provide a retrofit audit capability not previously available with a single audit monitoring assembly. Audit monitoring assembly 100 in combination with interface assembly 102 permits adaptability of one system 10 to vending machines from different manufacturers and of different configurations, from the same or different manufacturers. An identification code entered to identify the machine type and configuration is utilized by microprocessor 200 to select the appropriate parameters for decoding the signals received and output by the controller 310 of the vending machine 300. With proper decoding of the signals utilized by the vending machine 300, the audit monitoring assembly 100 can properly store the transactions of the particular machine to which it is connected. By coupling of an extension circuit board 175 to microprocessor 200 and connecting the adapter cable 101, row interface circuit 180 and column interface circuit 190 are added to detect changes in potential on row and column conductors coupled between the vending machine controller 310 and the matrix of product dispensing mechanisms 304. By monitoring the row and column conductors through interface circuits 180 and 190, microprocessor 200 can accurately identify a vend operation and determine from which matrix location product was vended, which further transaction data is stored.

Periodically, a data retriever 20 will be coupled to monitoring assembly 100, through either a hard wire or optical interface, to recover the audit data therefrom. The terminal 20 will read the data stored in non-volatile memory 220, through interface with microprocessor 200, and transfer to the microprocessor and time and date of the transaction from the terminal's internal clock. If the non-volatile memory 220 is to be erased subsequent to reading data therefrom, the transfer of the time and date from the terminal will proceed subsequent to such erasure, and the time and date from the real time clock 240 may also be stored at that time in order to provide a correlation between the terminal's clock and the time-of-day data provided by the real time clock 240. Thus, in combination, the alternative interfaces, both input and output, as well as the use of software to provide adaptive configurability, affords system 10 its unique and novel features which overcome the disadvantages and deficiencies of prior art systems.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or scope of the invention as defined in the appended claims.

What is claimed is:

1. An audit monitor for retrofit into a coin operated vending system, the vending system having means for receiving and dispensing funds in the form of a coin changer and a bill validator electrically coupled to a controller by a data link, said audit system comprising:

interface means coupled to the data link for monitoring electrical signals exchanged between the funds receiving and dispensing means and the controller to establish funds transaction data;

microprocessor means having a first input coupled to an output of said interface means for (1) interpreting said monitored electrical signals responsive to a preselected portion of a set of predetermined parameters, and (2) discriminating and accumulating both said funds transaction data and product dispensing transaction data for the coin operated vending system;

memory means coupled to said microprocessor means for storing said set of predetermined parameters and said accumulated funds transaction data and said product dispensing transaction data, said [memory] *microprocessor* means including means for reading said preselected portion of said set of stored predetermined parameters and [providing] an output thereof *provided from said memory means being coupled* to said microprocessor means;

power supply means coupled to said interface means, said microprocessor means, and said memory means for supplying an operating voltage thereto; and input/output means removably coupled to said microprocessor means for output of said accumulated funds transaction data and said product dispensing transaction data therefrom.

2. An audit monitor for retrofit into a coin operated vending system, the vending system having means for receiving and dispensing funds electrically coupled to a controller by a data link, said audit system comprising:

interface means coupled to the data link for monitoring electrical signals exchanged between the funds receiving and dispensing means and the controller to establish funds transaction data, said interface means including means coupled to the controller for monitoring electrical signals transmitted on a respective pair of a plurality of row and column conductors coupling the controller to a plurality of product dispensing mechanisms of the vending system to establish product dispensing transaction data;

microprocessor means having a first input coupled to an output of said interface means for (1) interpreting said monitored electrical signals responsive to predetermined parameters, and (2) discriminating and accumulating both said funds transaction data and said product dispensing transaction data for the coin operated vending system, said microprocessor means having a second input coupled to an output of said means for monitoring the row and column conductors, said microprocessor means including means for detecting which one of the plurality of product dispensing mechanisms is energized;

memory means coupled to said microprocessor means for storing said predetermined parameters and said accumulated funds transaction data and said product dispensing transaction data, said [memory] *microprocessor* means including means for reading said stored predetermined parameters and [providing] an output thereof *provided from said memory means being coupled* to said microprocessor means;

power supply means coupled to said interface means, said microprocessor means, and said memory means for supplying an operating voltage thereto; and input/output means removably coupled to said microprocessor means for output of said accumulated funds transaction data and said product dispensing transaction data therefrom.

3. An audit monitor as recited in claim 2 where said means for monitoring the row and column conductors includes (1) row interface means having a plurality of first input lines respectively coupled to the row conductors and a plurality of first output lines coupled to said microprocessor means for detecting a change in potential on one of the row conductors, and (2) column interface means having a plurality of second input lines respectively coupled to the column conductors and a plurality of second output lines coupled to said microprocessor means for detecting a change in potential on one of the column conductors.

4. The audit monitor as recited in claim 3 where said microprocessor means includes means for detecting said means for monitoring the row and column conductors being coupled to said second input.

5. The audit monitoring system as recited in claim 4 where said microprocessor means includes means for establishing a vend operation of the vending system, said means for establishing a vend operation determining said operation from (1) said monitored communication between the funds receiving and dispensing means and the controller when an absence of said coupling between said means for monitoring the row and column conductors and said second input of said microprocessor is detected, and (2) from detection of a change in potential in each of one of the plurality row conductors and one of the plurality of column conductors when said coupling between said means for monitoring the row and column conductors and said second input of said microprocessor is detected.

6. The audit monitor as recited in claim 2 where said means for monitoring the row and column conductors includes adapter means coupled to the controller, the row and column conductors, and said microprocessor means for monitoring signals carried by the row and column conductors.

7. The audit monitoring system as recited in claim 6 where said adapter means includes a plurality of output row lines and a plurality of output column lines.

8. The audit monitoring system as recited in claim 7 where said means for monitoring the row and column conductors further includes (1) row interface means having a plurality of first input lines respectively coupled to said adapter means output row lines and a plurality of first output lines coupled to said microprocessor means for detecting a motor home position feedback signal on one of said plurality of output row lines, and (2) column interface means having a plurality of second input lines respectively coupled to said adapter means output column lines and a plurality of second output lines coupled to said microprocessor means for detecting a change in potential on one of the plurality of output column lines.

9. An audit monitoring system for addition to any of a plurality of different types of existing coin operated vending systems, at least one of the types of vending systems having a currency validator and a coin changer electrically coupled to a controller by a data link, said audit monitoring system comprising:

first adapter means coupled to the currency validator, coin changer and controller of the vending system in place of the data link for monitoring electrical signals communicated therebetween representing funds transaction data;

first interface means coupled to said first adapter means for buffering said monitored signals;

microprocessor means coupled to an output of said first interface means for monitoring said buffered signals to discriminate and accumulate said funds transaction data therefrom, said microprocessor means including (1) means for interpreting said buffered accessed signals responsive to parameters selected from a plurality of predetermined parameters, and (2) means for receiving input of an identification code;

memory means coupled to said microprocessor means for storing said plurality of predetermined parameters and said funds transaction data, said [memory] *microprocessor* means including means for reading said selected parameters from said stored plurality of predetermined parameters and [providing] an output thereof *provided from said memory means* to said microprocessor means responsive to said identification code input to said microprocessor means;

power supply means coupled to said first interface means, said microprocessor means, and said memory means for supplying an operating voltage thereto; and input/output means removably coupled to said microprocessor means for output of said funds transaction data therefrom.

10. The audit monitor as recited in claim 9 further comprising second adapter means coupled to the controller, a plurality of row and column conductors coupling the controller to a plurality of product dispensing mechanisms of the vending system, and said microprocessor means including means for monitoring signals carried by the row and column conductors between the controller and the plurality of product dispensing mechanisms.

11. The audit monitoring system as recited in claim 10 where said second adapter means includes a plurality of output row lines and a plurality of output column lines.

12. The audit monitoring system as recited in claim 11 where said means for monitoring the row and column conductors further include (1) row interface means having a plurality of first input lines respectively coupled to said second adapter means output row lines and a plurality of first output lines coupled to said microprocessor means for detecting a motor home position feedback signal on one of said plurality of output row lines, and (2) column interface means having a plurality of second input lines respectively coupled to said second adapter means output column lines and a plurality of second output lines coupled to said microprocessor means for detecting a change in potential on one of the plurality of output column lines.

13. The audit monitor as recited in claim 11 where said means for monitoring the row and column conductors includes (1) row interface means having a plurality of first input lines respectively coupled to said second adapter means output row lines and a plurality of first output lines coupled to said microprocessor means for detecting a change in potential on one of the row conductors, and (2) column interface means having a plurality of second input lines respectively coupled to said adapter means output column lines and a plurality of second output lines coupled to said microprocessor means for detecting a change in potential on one of the column conductors.

14. An audit monitoring system for retrofit into a vending machine, the vending machine having means for receiving and dispensing funds electrically coupled to a controller by a data link and a plurality of product dispensing mechanisms electrically coupled to the controller by a plurality of conductors arranged as an array of rows and columns, said audit system comprising:

interface means coupled to the controller for monitoring signals received and transmitted thereby, said interface means including means coupled to the data link for monitoring communication between the funds receiving and dispensing means and the controller and means coupled to the controller for monitoring electrical signals carried by the row and column conductors;

microprocessor means having a first input coupled to an output of said means for monitoring communication and a second input coupled to said means for monitoring the row and column conductors for (1) interpreting said monitored communications responsive to a pre-selected set of predetermined parameters, (2) detecting which one of the plurality of product dispensing mechanisms is energized, and (3) discriminating and accumulating transaction data for the coin operated vending machine, said transaction data including accumulation of vend operations for each of the product dispensing mechanisms;

memory means coupled to said microprocessor means for storing said set of predetermined parameters and said transaction data, said [memory] *microprocessor* means including means for reading said stored pre-selected set of predetermined parameters and [providing] an output thereof *provided from said memory means being coupled* to said microprocessor means;

power supply means coupled to said interface means, said microprocessor means, and said memory means for supplying an operating voltage thereto; and input/output means removably coupled to said microprocessor means for output of said transaction data therefrom.

15. The audit monitoring system as recited in claim 14 where said means for monitoring the row and column conductors includes adapter means coupled to the controller, the row and column conductors, and said microprocessor means for monitoring signals carried by the row and column conductors.

16. The audit monitoring system as recited in claim 15 where said adapter means includes a plurality of output row lines and a plurality of output column lines.

17. The audit monitoring system as recited in claim 16 where said means for monitoring the row and column conductors further includes (1) row interface means having a plurality of first input lines respectively coupled to said adapter means output row lines and a plurality of first output lines coupled to said microprocessor means for detecting a motor home position feedback signal on one of said plurality of output row lines, and (2) column interface means having a plurality of second input lines respectively coupled to said adapter means output column lines and a plurality of second output lines coupled to said microprocessor means for detecting a change in potential on one of the plurality of column lines.

18. The audit monitoring system as recited in claim 14 where said means for monitoring the row and column conductors includes (1) row interface means having a plurality of first input lines respectively coupled to the row conductors and a plurality of first output lines coupled to said microprocessor means for detecting a change in potential on one of the plurality of row conductors, and (2) column interface means having a plurality of second input lines respectively coupled to the column conductors and a plurality of second output lines coupled to said microprocessor means for detecting a change in potential on one of the plurality of column conductors.

19. The audit monitoring system as recited in claim 14 where said microprocessor means includes means for detecting said means for monitoring the row and column conductors being coupled to said second input.

20. The audit monitoring system as recited in claim 19 where said microprocessor means includes means for establishing a vend operation of the vending machine, said means for establishing a vend operation determining said operation from (1) said monitored communication between the funds receiving and dispensing means and the controller when an absence of said coupling between said means for monitoring the row and column conductors and said second input of said microprocessor is detected, and (2) from detection of a change in potential in each of one of the plurality row conductors and one of the plurality of column conductors when said coupling between said means for monitoring the row and column conductors and said second input of said microprocessor is detected.

21. An audit monitor for a coin operated vending system, the vending system having a plurality of product dispensing mechanisms coupled to a controller by a plurality of row and column conductors, said audit system comprising:

interface means connected to the plurality of row and column conductors for monitoring electrical signals carried thereby;

processor means having an input coupled to an output of said interface means for discriminating and accumulating transaction data for the coin operated vending system;

memory means coupled to said processor means for storing said accumulated transaction data, said [memory] *processor* means including means for reading [said stored] predetermined parameters *stored in said memory means* and [providing] an output thereof *provided from said memory means being coupled* to said processor means;

power supply means coupled to said interface means, said processor means, and said memory means for supplying an operating voltage thereto; and input/output means coupled to said processor means for output of said accumulated transaction data therefrom.

* * * * *